(12) United States Patent
Frücht

(10) Patent No.: US 7,723,954 B2
(45) Date of Patent: May 25, 2010

(54) METHOD AND DEVICE FOR SUPPLYING AT LEAST ONE LOAD

(75) Inventor: Johannes Frücht, Soest-Ampen (DE)

(73) Assignee: Cooper Crouse-Hinds GmbH, Soest (DE)

( * ) Notice: Subject to any disclaimer, the term of this patent is extended or adjusted under 35 U.S.C. 154(b) by 302 days.

(21) Appl. No.: 10/563,765

(22) PCT Filed: Mar. 29, 2004

(86) PCT No.: PCT/EP2004/003326

§ 371 (c)(1),
(2), (4) Date: Oct. 2, 2006

(87) PCT Pub. No.: WO2005/006515

PCT Pub. Date: Jan. 20, 2005

(65) Prior Publication Data

US 2007/0052295 A1 Mar. 8, 2007

(30) Foreign Application Priority Data

Jul. 8, 2003 (DE) ................................ 103 30 834

(51) Int. Cl.
*H02J 7/00* (2006.01)
(52) U.S. Cl. ................ 320/117; 320/116; 320/120; 320/121
(58) Field of Classification Search ............... 320/117, 320/103, 116, 120, 121, 125, 127, 134, 136
See application file for complete search history.

(56) References Cited

U.S. PATENT DOCUMENTS

| 4,297,629 | A | * | 10/1981 | Godard et al. | 320/117 |
| 5,808,444 | A | * | 9/1998 | Saeki et al. | 320/117 |
| 5,811,959 | A | * | 9/1998 | Kejha | 320/126 |
| 6,140,799 | A | * | 10/2000 | Thomasson | 320/117 |
| 6,430,692 | B1 | * | 8/2002 | Kimble et al. | 713/300 |
| 6,617,831 | B2 | * | 9/2003 | Perol | 323/234 |
| 6,737,756 | B1 | * | 5/2004 | Gale et al. | 290/7 |
| 6,930,404 | B1 | * | 8/2005 | Gale et al. | 290/40 C |

FOREIGN PATENT DOCUMENTS

EP 97106773.1 10/1997

* cited by examiner

Primary Examiner—Edward Tso
Assistant Examiner—Alexis Boateng
(74) Attorney, Agent, or Firm—Fish & Richardson P.C.

(57) ABSTRACT

The invention relates to a method and a device for supplying at least one load consumer during a mains failure. According to said method, a plurality of batteries acts as an emergency voltage source during the failure of a mains voltage source in order to supply the load consumer(s). The plurality of batteries is connected to the mains voltage source. The batteries are interconnected in series in order to form the emergency supply for the load consumer. To permit a simple, cost-effective emergency supply with a reliable charging of the batteries, the plurality of series-connected batteries is sub-divided into at least two battery groups using a splitter circuit and each of said battery groups is connected to the mains voltage source for charging purposes by means of a corresponding connection circuit.

16 Claims, 2 Drawing Sheets

METHOD AND DEVICE FOR SUPPLYING AT LEAST ONE LOAD

Figure 1:
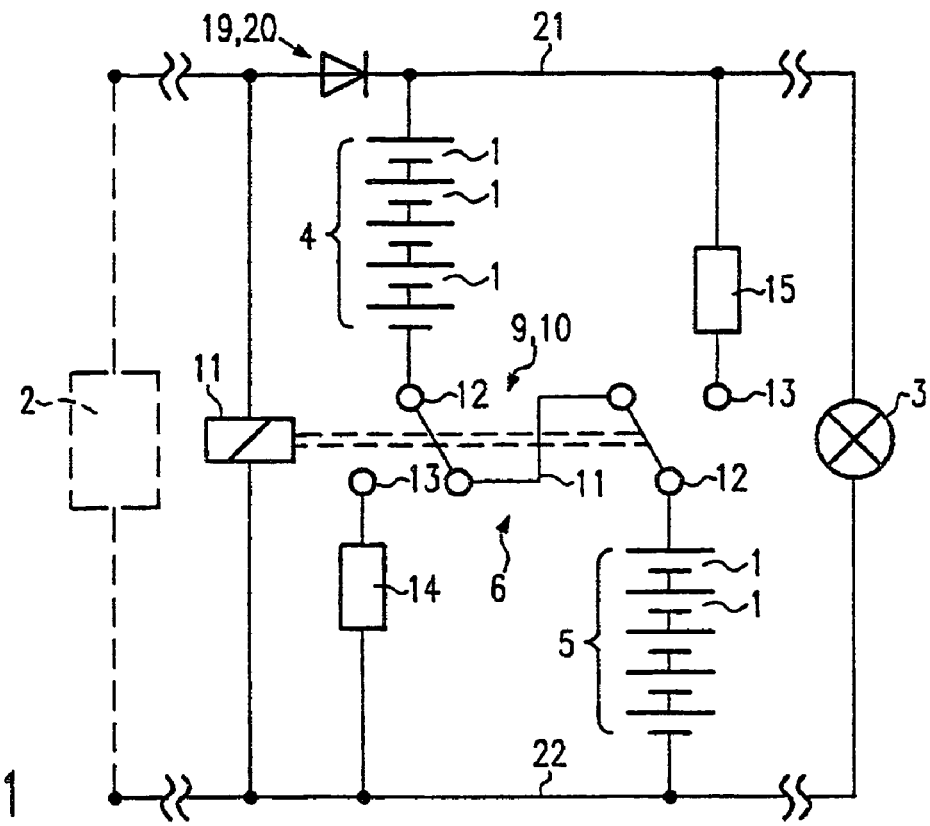

The invention relates to a method and a device for supplying at least one load during a mains failure, whereby during the failure of a mains voltage source a plurality of batteries supply the at least one load and are connected to the mains voltage source.

Such methods and devices are, for example, used for the supply of lighting systems, which must be kept operating also in emergency situations or with the mains failure of an emergency lighting system. Such lighting systems may comprise a range of safety or escape route luminaires. Apart from pure emergency lightning also other loads such as direct current motors or similar equipment can be supplied.

Generally the supply of such loads occurs via a mains voltage source and it is only with the failure of this mains voltage source or the interruption of the connection to this mains voltage source that the corresponding load continues to be supplied generally via batteries. Here, a number of batteries are connected together in series to be able to provide sufficient supply voltage for the operation of the at least one load also over a longer time period.

In order to maintain an adequate state of charge of the batteries, they are charged during supply by the mains voltage source. However, here it must be ensured that such a battery charging voltage is generally higher than a corresponding discharge voltage and it is therefore often necessary to use a separate power supply unit for charging the batteries. This increases the wiring complexity and the devices for emergency supply are more expensive with more complex circuits.

The object of the invention is to facilitate an emergency supply with reliable charging of the batteries in a simple and inexpensive manner.

This object is solved according to the method by the features of Patent Claim 1 and according to the device by the features of Patent Claim 7.

According to the invention the batteries are split into at least two battery groups. Each of these battery groups is connected to the mains voltage source for charging. When emergency supply is required from the batteries, they are connected in series and then act as an emergency voltage source.

When splitting the series-connected batteries, an appropriate splitting circuit is provided and for connecting the battery groups to the mains voltage source a connecting circuit is provided. In this respect splitting and/or connection circuits also facilitate the series connection of the battery groups when used as an emergency voltage source.

Through subdividing the batteries into battery groups, which are charged separately from one another by the mains voltage source, it is no longer necessary to use an additional mains supply unit, because the charging voltages for each of the battery groups are no longer higher than the discharge voltage of the battery groups connected in series during emergency supply.

In this respect it is possible in a simple manner to subdivide the batteries into more than two battery groups, so that each of these battery groups is charged in parallel by the mains voltage source and the load or loads are supplied during emergency supply by the serial connection of all battery groups.

To further reduce the circuit complexity, the splitting circuit and the connecting circuit can be formed by one switching device, so that through its actuation on one hand the subdivision of the batteries into battery groups and their parallel connection with the mains supply voltage can be realised and on the other hand the series connection of all batteries can be restored and the connection to the load during the emergency supply is possible.

Here, the switching device can, for example, exhibit two states, whereby in the first state the splitting into and the parallel connection of the battery groups to the mains voltage source occurs and in the second state the serial connection of all batteries and the supply of the load occurs.

During mains failure, i.e. the failure of the mains supply voltage, to ensure that the emergency supply takes place through the series-connected batteries of all battery groups, such a switching can occur automatically on the failure of the mains voltage source. An example of an appropriate switching device is a relay which during mains operation is energised by means of the mains voltage source and which closes appropriate contacts to split batteries up into battery groups and on mains failure the relay contacts drop back automatically into their released state, whereby the serial connection of all batteries is restored for the emergency supply.

Another realisation of such a switching device can occur through a transistor which, for example, blocks during mains operation whereby the batteries are split into various battery groups, and which conducts during mains failure whereby the series connection of all batteries in the battery groups is restored for the emergency supply.

In order to avoid a high charging voltage for the individual battery groups during connection to the mains voltage source, a charge-voltage limiting circuit can limit an appropriate charge voltage of the battery groups. Such a charge-voltage limiting circuit is normally connected in parallel to the battery groups. In this respect, in order to arrange the charging of the batteries in the various battery groups such that the individual groups are charged with a suitable current, an appropriate resistance can be assigned to each battery group for charging.

In doing this, the overall structure can be further simplified when each battery group comprises the same number of batteries. Consequently, it is, for example, possible that the resistances for charging are equal and that the splitting of the batteries into, for example, two battery groups occurs in the middle of the series connection of all batteries.

To prevent the batteries from being too severely discharged when using the series-connected batteries for the emergency supply, an exhaustive discharge protection circuit can permit discharge of the battery groups only up to a certain value and then prevent further discharge.

With the aforementioned use of a transistor as an electronic switch for the switching device and in particular as the splitting circuit, the overall structure of the circuit can be further simplified and more reliably designed if each battery group is connected by at least a second or third transistor to feeder lines of the mains voltage supply or of the load. These second and third transistors act essentially as a connection circuit to connect each battery group in parallel with the mains voltage source. In this respect the second and third transistors are formed or connected with regard to their blocking and conduction behaviour in reverse to the first transistor so that when the first transistor blocks, the second and third transistors are conducting to connect each battery group to the mains supply voltage. In contrast the first transistor is conducting during the emergency supply, whereby the battery groups are connected together in series, whereas the second and third transistors block and consequently the connection of each battery group to the mains voltage source is interrupted.

In this respect it should be noted that, for example, the first transistor represents an embodiment of an exhaustive discharge protection circuit, because it blocks when one of the two battery groups is discharged below a certain threshold, so that no further discharge of the battery groups takes place.

To be able to optionally charge the batteries of each battery group faster and with higher currents, there is the possibility of connecting a constant current source between the second or third transistor and the respective associated battery group.

To decouple the load and batteries from the mains voltage source, a diode device can be connected between the source and the battery groups and/or load for decoupling.

In this respect a simple embodiment of such a diode device is at least one diode connected in a connecting line to the mains voltage source.

In the following, advantageous embodiments of the invention are explained in more detail based on the figures enclosed in the drawing.

Figure 2:
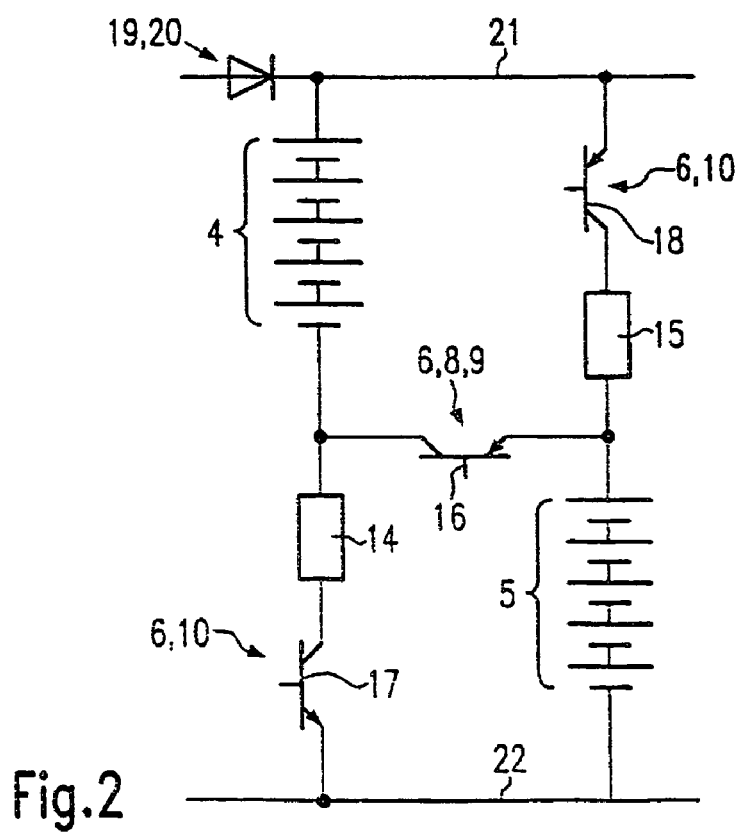
Figure 3:
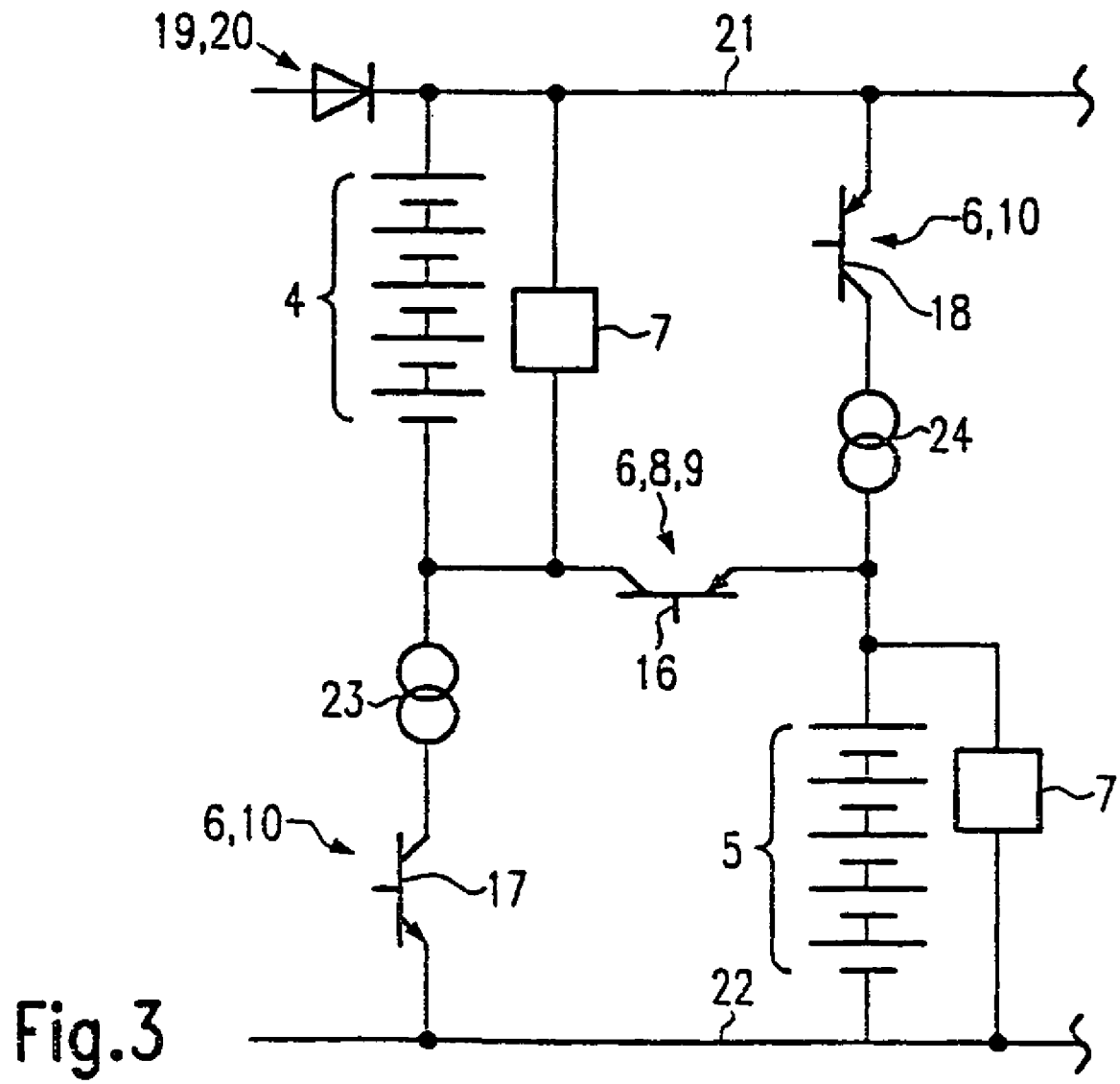

The following are shown:

FIG. 1 a schematic diagram of a circuit for the device according to the invention for a first embodiment with an electromechanical switching device;

FIG. 2 a schematic diagram of a circuit of a second embodiment of the device according to the invention with an electronic switching device, and FIG. 3 a schematic sketch of a third embodiment also with an electronic switching device.

FIG. 1 shows a schematic sketch of a first embodiment of the device according to the invention for the supply of at least one load 3. The device is realised as a circuit which comprises a plurality of single batteries 1. The single batteries 1 are provided for the emergency supply during the failure of a mains voltage source 2 or with the interruption of a connection to the mains voltage source 2, whereby in this case all batteries are connected in series and supply load 3.

It should be noted that in FIG. 1 only one load is shown, whereby of course many loads, such as lamps, direct current motors or similar equipment can be connected to the batteries 1.

To charge the batteries 1 they are split into two groups 4 and 5. The first battery group 4 comprises five batteries, as does the second battery group 5. The various battery groups are connected in parallel to the mains voltage source 2 for charging and they are connected in series with the appropriate load during emergency supply. The switchover between series and parallel occurs via a suitable switching device 6, which also acts as the splitting circuit 9 and as the connecting circuit 10.

That is, the switching device 6 on one hand splits up the respective five batteries into the battery groups 4 and 5 and on the other hand provides the parallel connection of both battery groups 4, 5 to the mains voltage source 2. In addition the switching device 6 is also used to connect together the two battery groups 4 and 5 in series again when the load 3 is supplied in emergency.

The switching device 6 according to FIG. 1 is formed by a relay 11. This is also supplied from the mains voltage source 2. When the relay 11 is energised by the mains voltage source 2, the contacts 12 are in each case directly connected to the contacts 13, whereby the batteries 1 in the battery groups 4 and 5 are split and connected to the mains voltage source 2 via suitable resistances 14, 15 for charging in parallel. The resistances 14, 15 are selected such that the single battery groups are charged with sufficient current.

In parallel to each battery group, refer to FIG. 3, a charge-voltage limiting circuit 7 can be provided for all embodiments. This prevents a too high a charge voltage on the various battery groups.

When the relay 11 is no longer energised, it switches automatically back to the released state. In this state the contacts 12 are connected directly together, refer to the illustration in FIG. 1. Due to the direct connection of the contacts 12, the two battery groups 4, 5 and therefore all the batteries 1 are connected in series and are used to provide a sufficiently high voltage for the load 3.

With all the embodiments the batteries and/or the load 3 are decoupled from the mains voltage supply 2 by a diode device 19 with at least one diode 20. The diode 20 is here arranged in one of the connecting lines 21, 22 between the load 3 and the mains voltage supply 2. The connecting lines 21, 22 are also used for the connection of the load 3 to the battery groups 4, 5, respectively for the connection of the battery groups 4, 5 to the mains supply voltage 2.

In FIG. 1 an exhaustive discharge protection circuit 8 can be provided analogously to FIGS. 2 and 3, which allows the discharge of the battery groups to a specified threshold value, but then prevents further discharge.

In FIG. 1 the circuit device 6 is realised by the electromechanical relay 11. In FIGS. 2 and 3 the circuit device 6 is realised by a plurality of transistors. A first transistor 16 is used essentially as the splitting circuit 9, which in the conducting state connects the battery groups 4 and 5 in series with one another for the emergency supply of the load 3, refer to FIG. 2. In the blocking state the battery groups 4, 5 are not connected together in series, but rather are connected via resistances 14, 15 and second and third transistors 17, 18 to the mains voltage source 2.

It should be noted that in FIGS. 2 and 3 some details from FIG. 1 are not illustrated, such as for example the mains voltage supply 2 and the load 3. These are used analogously with the embodiments according to FIGS. 2 and 3.

The second and third transistors 17, 18 are conducting during mains operation, i.e. the supply of the load 3 by the mains voltage source 2, so that charging of the batteries of each battery group 4, 5 occurs via transistor 17 and resistance 14, respectively transistor 18 and resistance 15. During a mains failure the transistors 17 and 18 block, whereas the first transistor 16 is conducting.

In this respect is should be noted that the first transistor 16 also forms the exhaustive discharge protection circuit 8. Here, the first transistor 16 blocks when the discharge of the battery groups 4, 5 reaches a certain value so that further discharge is prevented.

This also applies analogously to the third embodiment according to FIG. 3. This differs from the second embodiment according to FIG. 2 due to the omission of the corresponding resistances 14, 15. Instead, here constant current sources 23 and 24 are connected between the second transistor 17 and the battery group 4, respectively the third transistor 18 and the battery group 5.

It is only in FIG. 3 that a suitable charge-voltage limiting circuit 7 is illustrated which is connected in parallel to the battery groups 4, 5. This can also be used analogously with the embodiments according to FIGS. 1 and 2.

Due to the constant current sources 23 and 24, there is the possibility of also charging the batteries with essentially higher currents. The control of charging can in this respect occur via a separate electronic configuration which is not illustrated. Switching the charging currents on and off occurs via the second and third transistors 17, 18, refer also to FIG. 2.

The invention claimed is:

1. A method for supplying power to at least one load during failure of a main voltage source, wherein batteries serve as an emergency voltage source supply to the at least one load during failure of the main voltage source and are connected to the main voltage source, the method comprising:

splitting the batteries into at least two battery groups, with the batteries of each group being connected in series;

connecting each of the at least two battery groups in parallel to the main voltage source for charging, and connecting the at least two battery groups in series to the load for use as the emergency voltage source, wherein splitting the at least two battery groups and connecting the at least two battery groups in parallel to the main voltage source comprises using a single switching device, the single switching device comprising an element that is directly coupleable to each of the at least two battery groups such that the single switching device is configured to both split the batteries into the at least two battery groups and to connect each of the at least two battery groups in parallel, and wherein the at least two battery groups and the load are decoupled from the main voltage source by a diode device with at least one diode arrangement therebetween.

2. The method of claim 1, wherein connecting the at least two battery groups in series to the load for use as the emergency voltage source comprises doing so by having the single switching device switch over into a state different from a state in which the batteries groups are split.

3. The method of claim 2, further comprising having the single switching device switch over into the different state automatically upon the failure of the main voltage source.

4. The method of claim 1, further comprising limiting a charge voltage on the at least two battery groups using a charge-voltage limiting circuit.

5. The method of claim 1, further comprising interrupting further discharging of the at least two battery groups using an exhaustive discharge protective circuit after the at least two battery groups have discharged to a specified value.

6. A device for supplying power to at least one load during failure of a main voltage source, the device comprising:

batteries connected so as to be connected in series to deliver power to the at least one load during failure of the main voltage source;

a splitting circuit configured to split the batteries into at least two battery groups, with the batteries of each battery group being connected in series; and a connection circuit configured to connect each of the at least two battery groups in parallel to the main voltage source, wherein a single switching device provides both the splitting circuit and the connection circuit, the single switching device comprising an element that is directly coupleable to each of the at least two battery groups such that the single switching device is configured to both split the batteries into the at least two battery groups and to connect each of the at least two battery groups in parallel, and wherein a diode device for decoupling is connected between the main voltage source and the at least two battery groups, said diode device comprising at least one diode connected in a connecting line to the main voltage source.

7. The device of claim 6, wherein the single switching device is configured to connect the at least two battery groups in parallel for charging and in series for supplying power to the load.

8. The device of claim 6, wherein the single switching device comprises at least one relay.

9. The device of claim 8, wherein contacts of the relay are arranged in a release state during failure of the main voltage source, such that the at least two battery groups are connected in series to supply power to the load.

10. The device of claim 6, wherein a resistance for charging is assigned to each battery group.

11. The device of claim 6, wherein each battery group comprises the same number of batteries.

12. The device of claim 6, further comprising a charge-voltage limiting circuit connected in parallel with each of the battery groups.

13. The device of claim 6, further comprising an exhaustive discharge protection circuit connected to the battery groups.

14. The device of claim 6, wherein the splitting circuit comprises at least a first transistor configured as an electronic switch.

15. The device of claim 14, wherein the battery groups are connected to feeder lines of the main voltage source or the load by second and third transistors.

16. The device of claim 15, wherein a constant current source is connected between the second transistor and an associated battery group.

* * * * *